O. EICK.
APPARATUS FOR CLEANSING BOTTLES.
APPLICATION FILED FEB. 24, 1906.

947,151.

Patented Jan. 18, 1910.
12 SHEETS—SHEET 1.

Witnesses

Inventor
Otto Eick
By Dodge and Sons,
Attorneys

O. EICK.
APPARATUS FOR CLEANSING BOTTLES.
APPLICATION FILED FEB. 24, 1906.

947,151.

Patented Jan. 18, 1910.

Inventor
Otto Eick,

O. EICK.
APPARATUS FOR CLEANSING BOTTLES.
APPLICATION FILED FEB. 24, 1906.
947,151.
Patented Jan. 18, 1910.
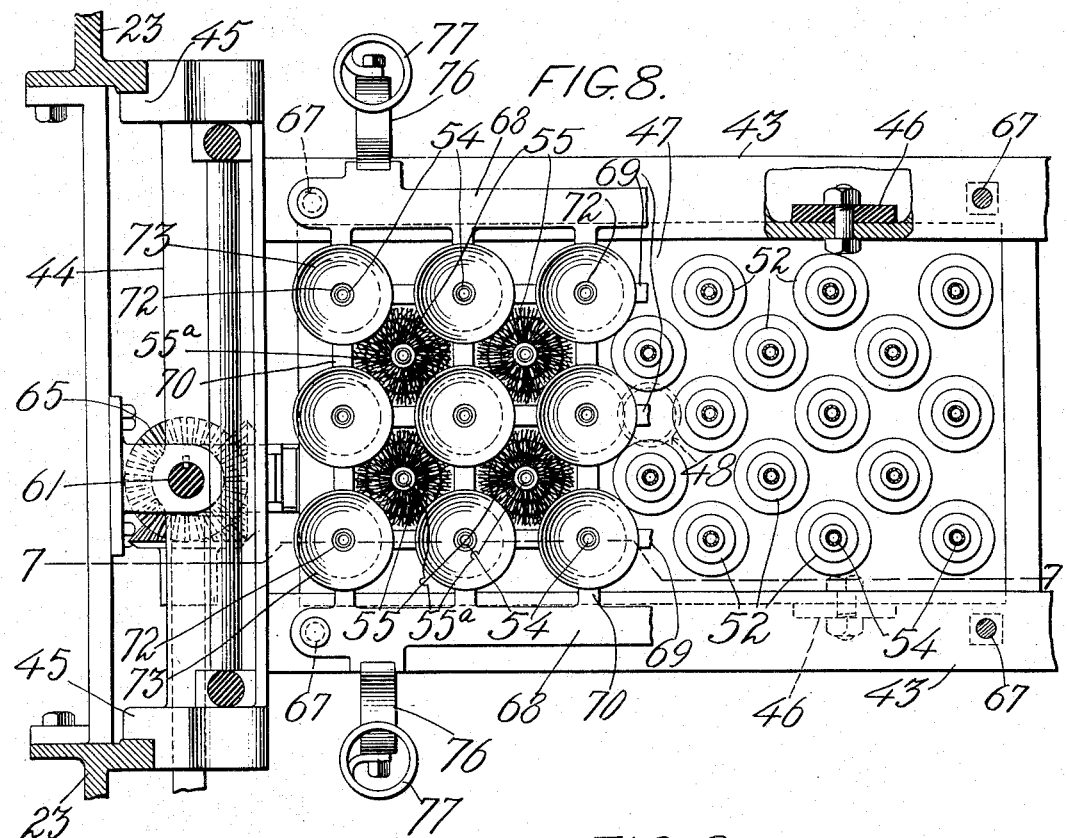
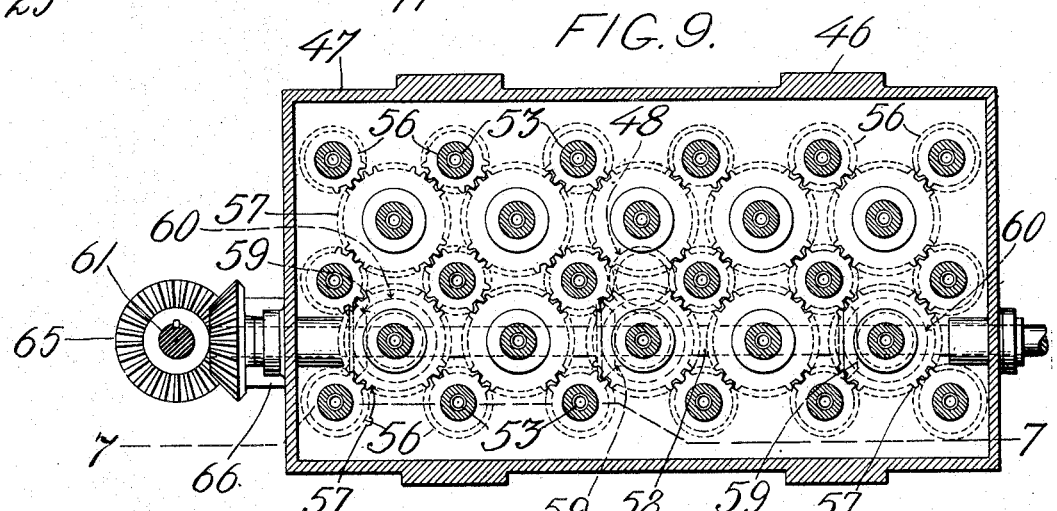
Inventor:
Otto Eick,
Witnesses
By Dodge and Son,
Attorneys

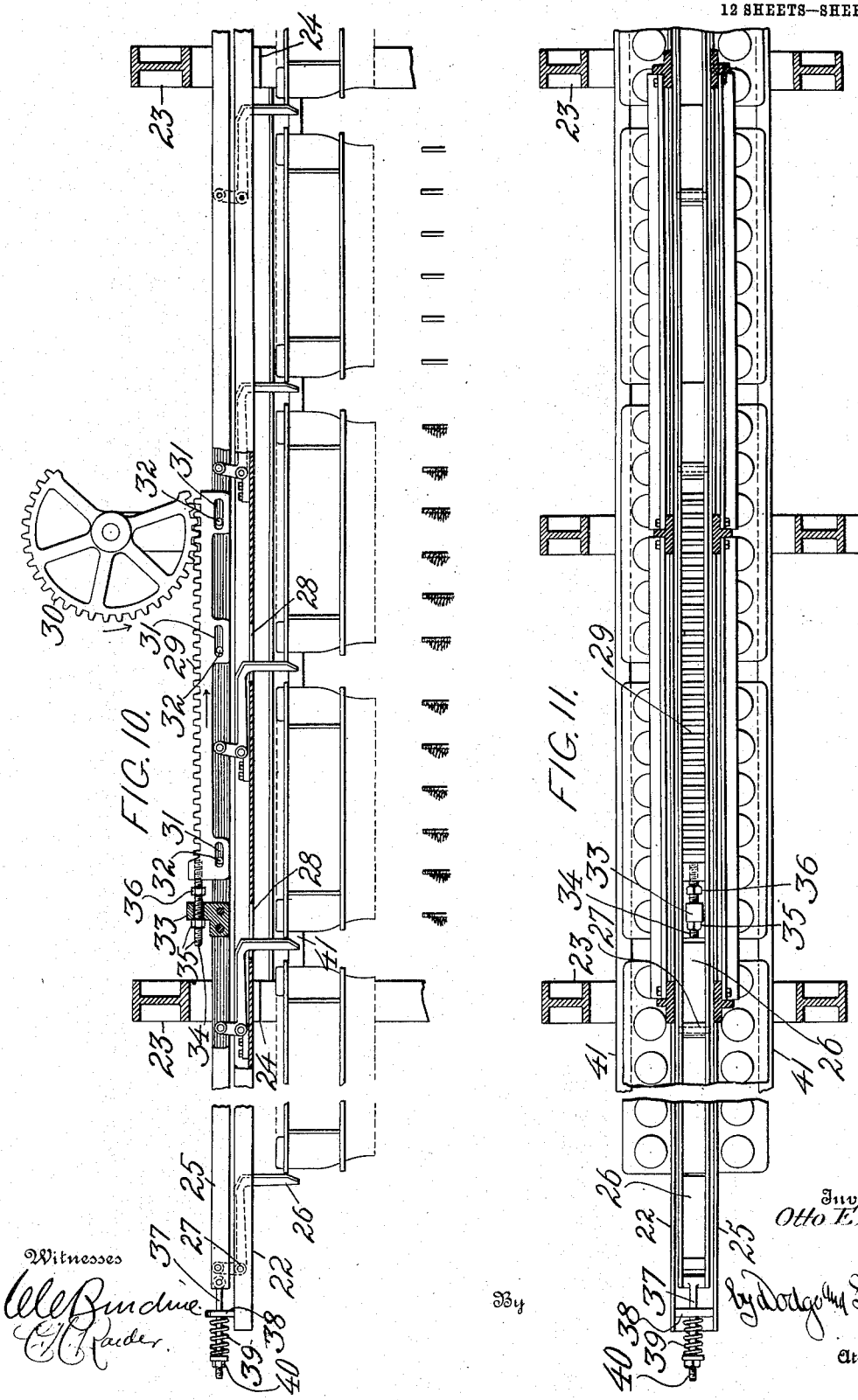

O. EICK.
APPARATUS FOR CLEANSING BOTTLES.
APPLICATION FILED FEB. 24, 1906.
947,151.
Patented Jan. 18, 1910.
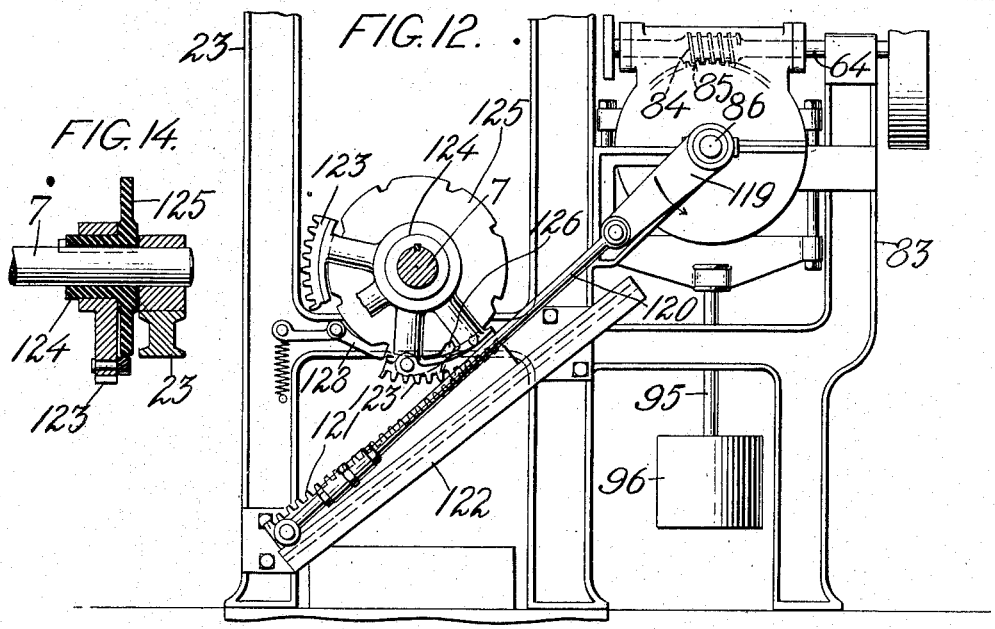
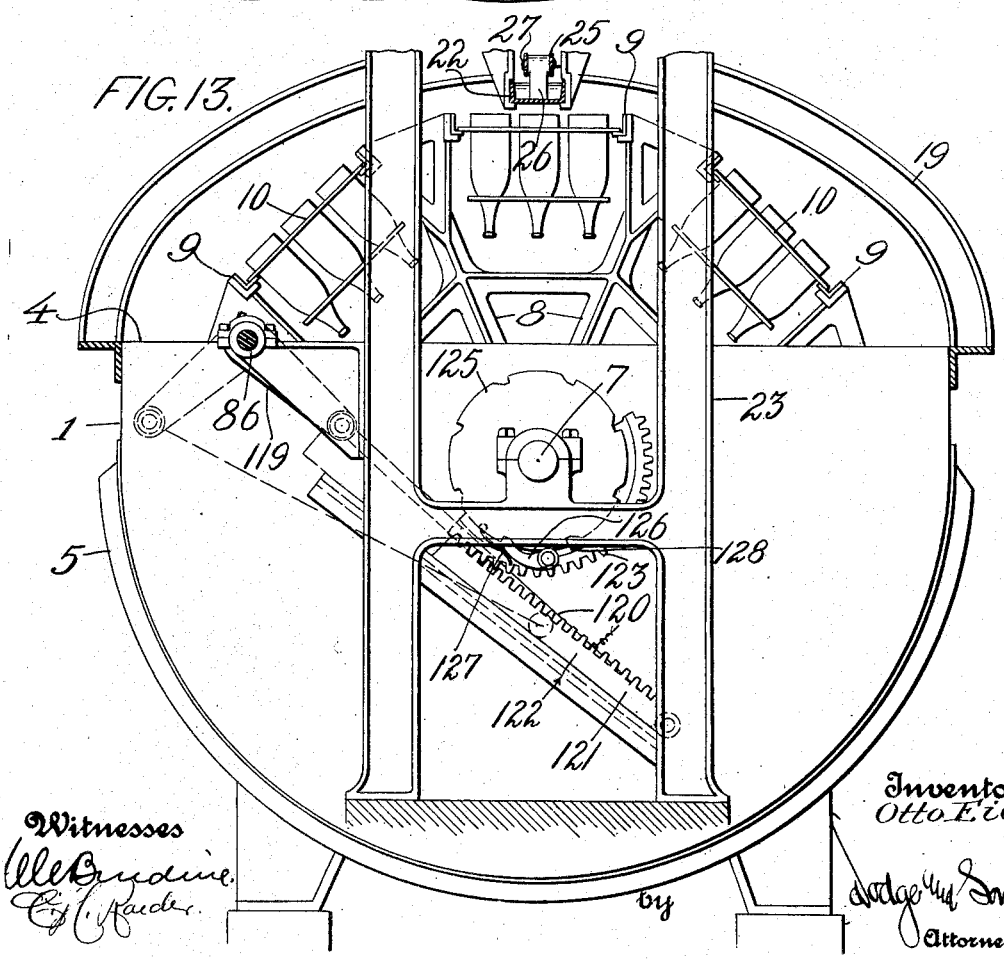
Witnesses
Inventor:
Otto Eick
by
Attorneys O. EICK.
APPARATUS FOR CLEANSING BOTTLES.
APPLICATION FILED FEB. 24, 1906.
947,151.
Patented Jan. 18, 1910.
12 SHEETS—SHEET 10.
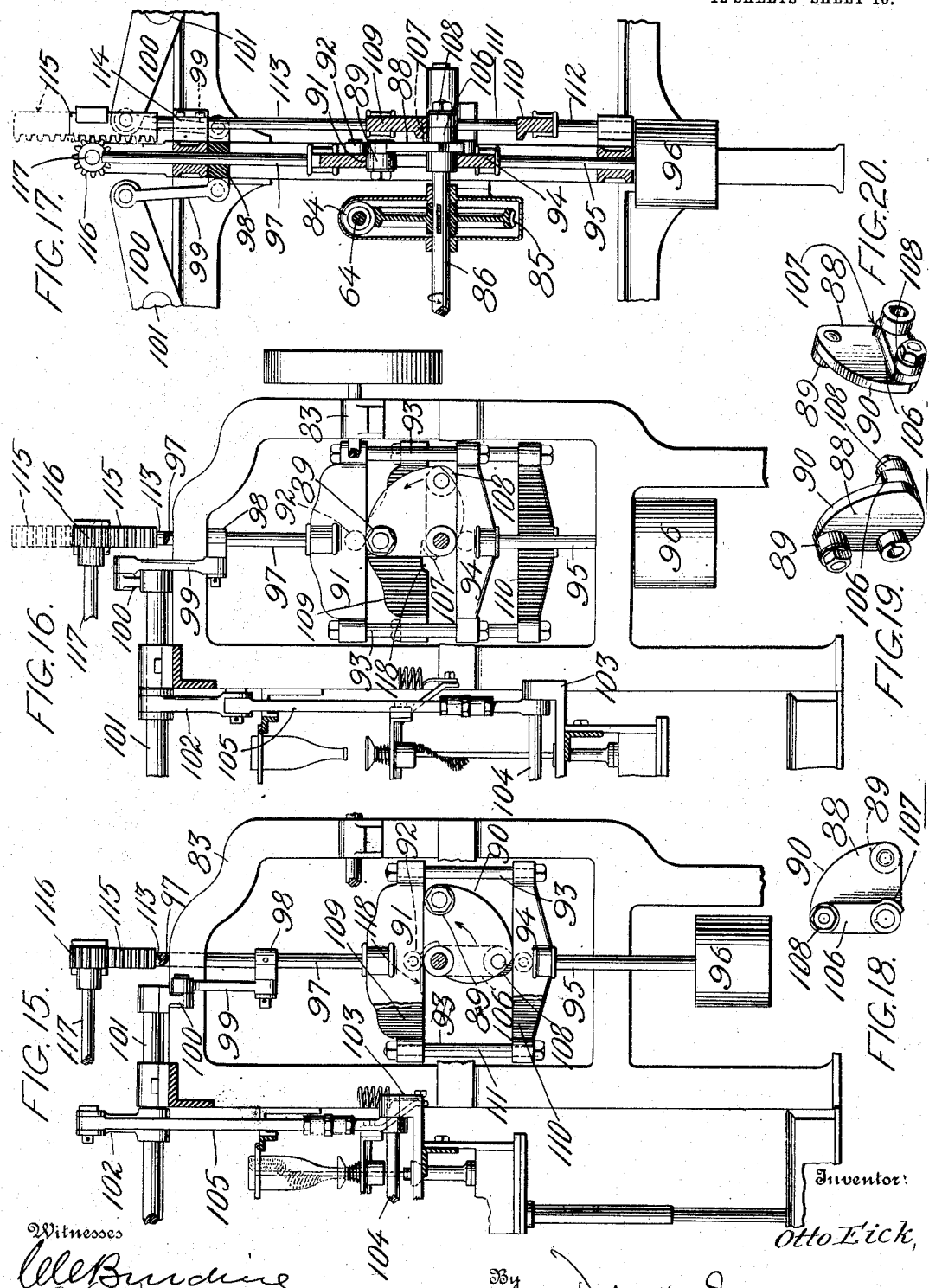
Witnesses
Inventor:
Otto Eick,
By Dodge and Sons
Attorneys

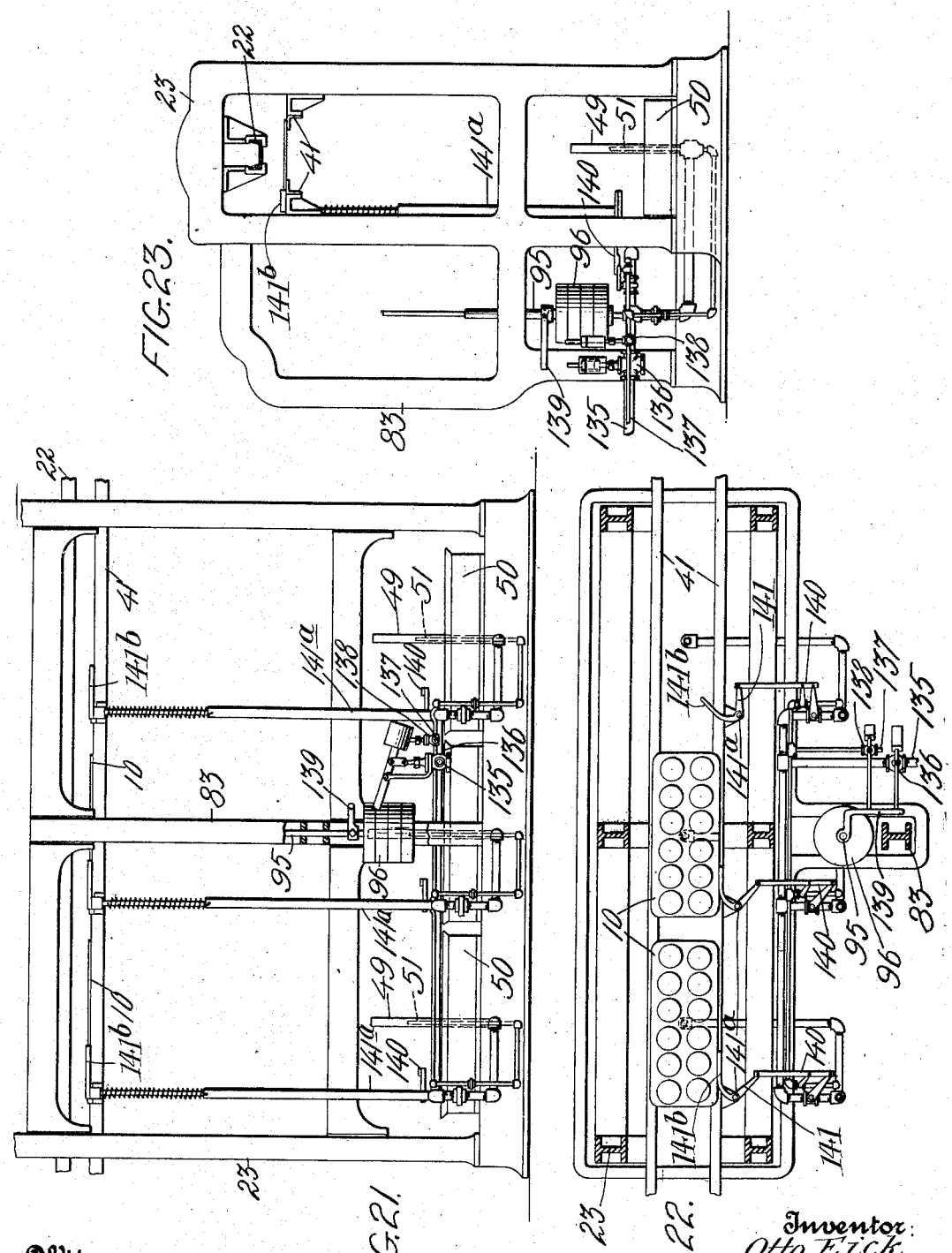

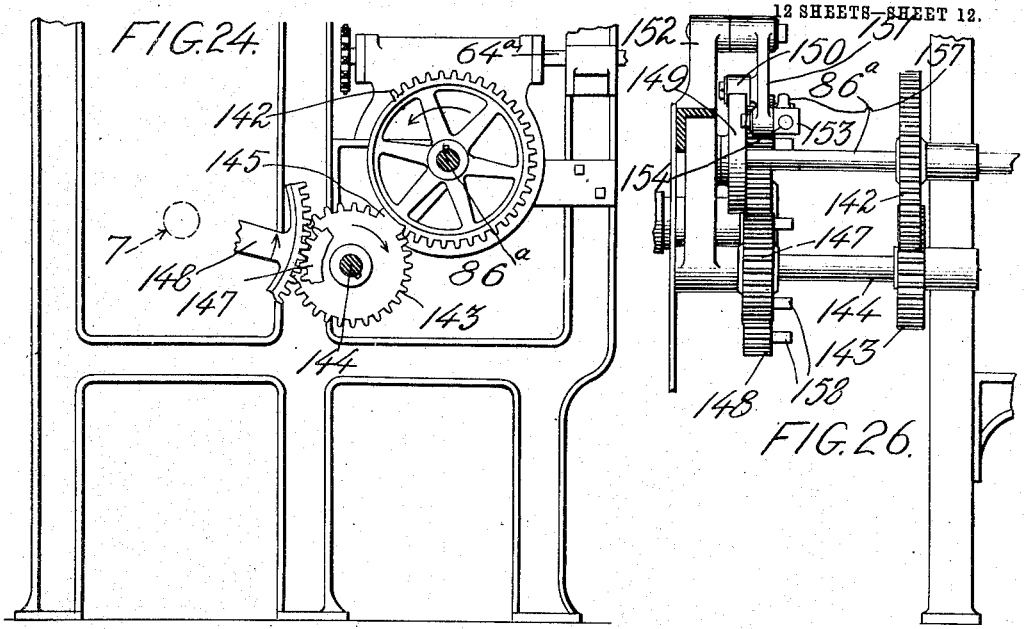
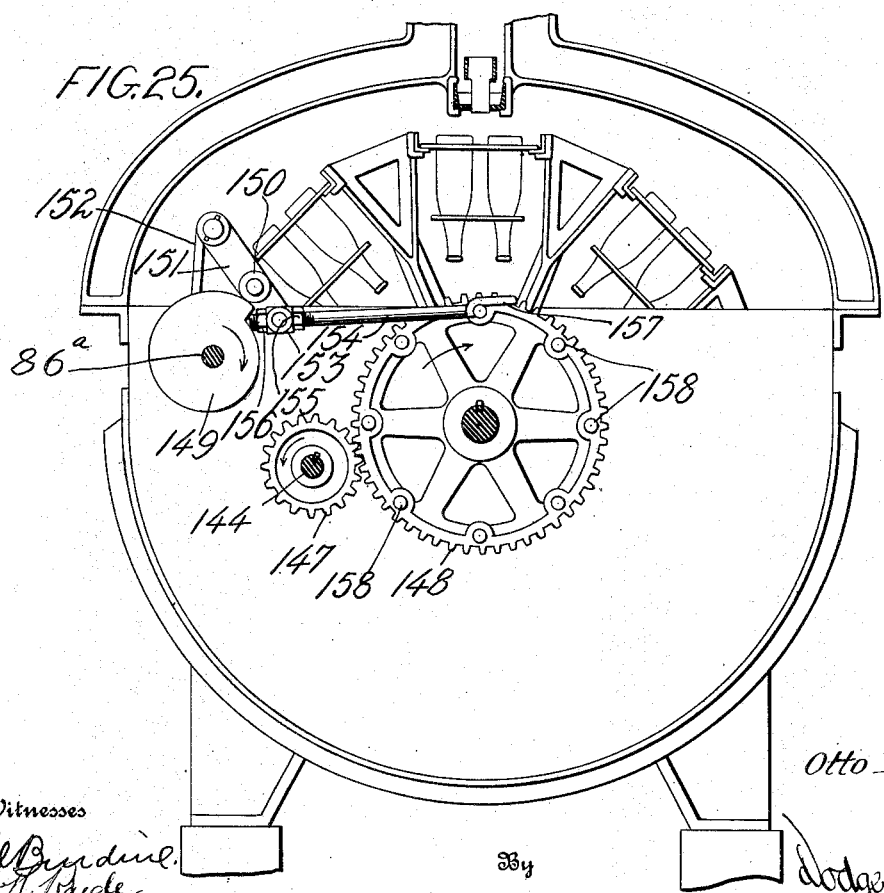

UNITED STATES PATENT OFFICE.

OTTO EICK, OF BALTIMORE, MARYLAND.

APPARATUS FOR CLEANSING BOTTLES.

947,151.  Specification of Letters Patent.  Patented Jan. 18, 1910.

Application filed February 24, 1906. Serial No. 302,775.

*To all whom it may concern:*

Be it known that I, OTTO EICK, a citizen of the United States, residing at Baltimore, in the State of Maryland, have invented certain new and useful Improvements in Apparatus for Cleansing Bottles, of which the following is a specification.

Figure 1:
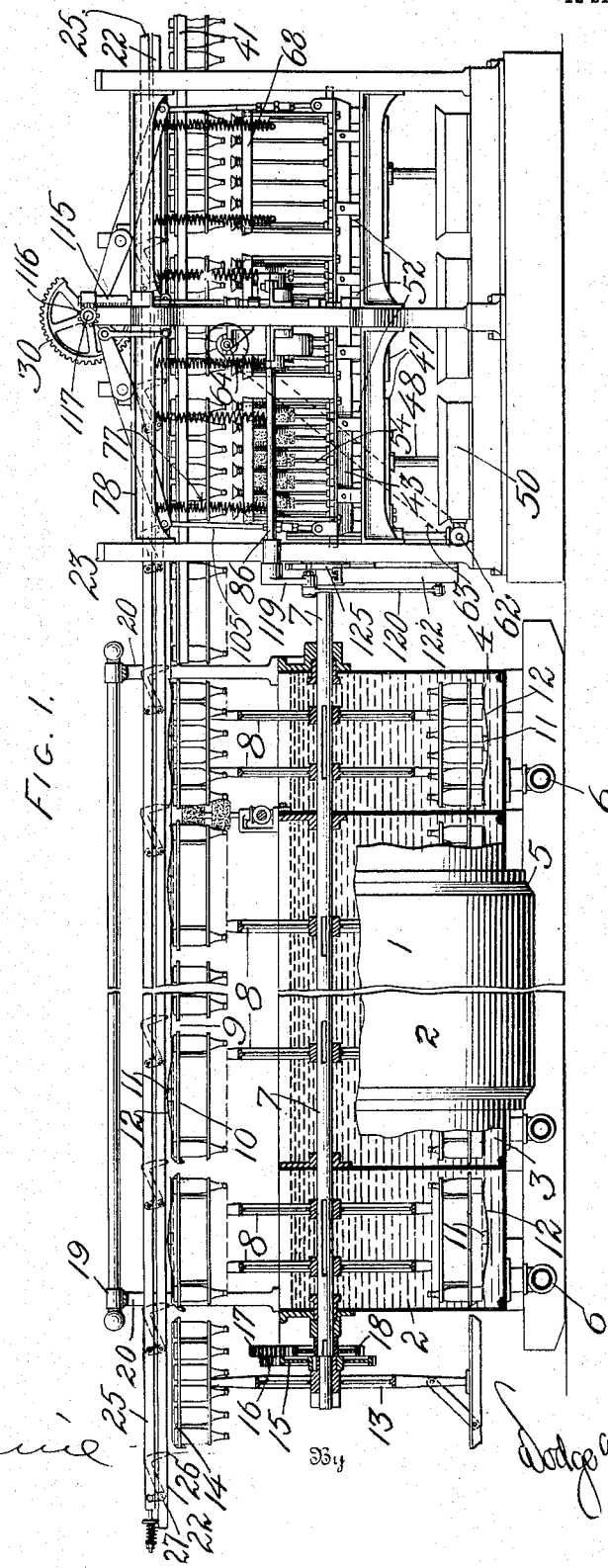
Figure 2:
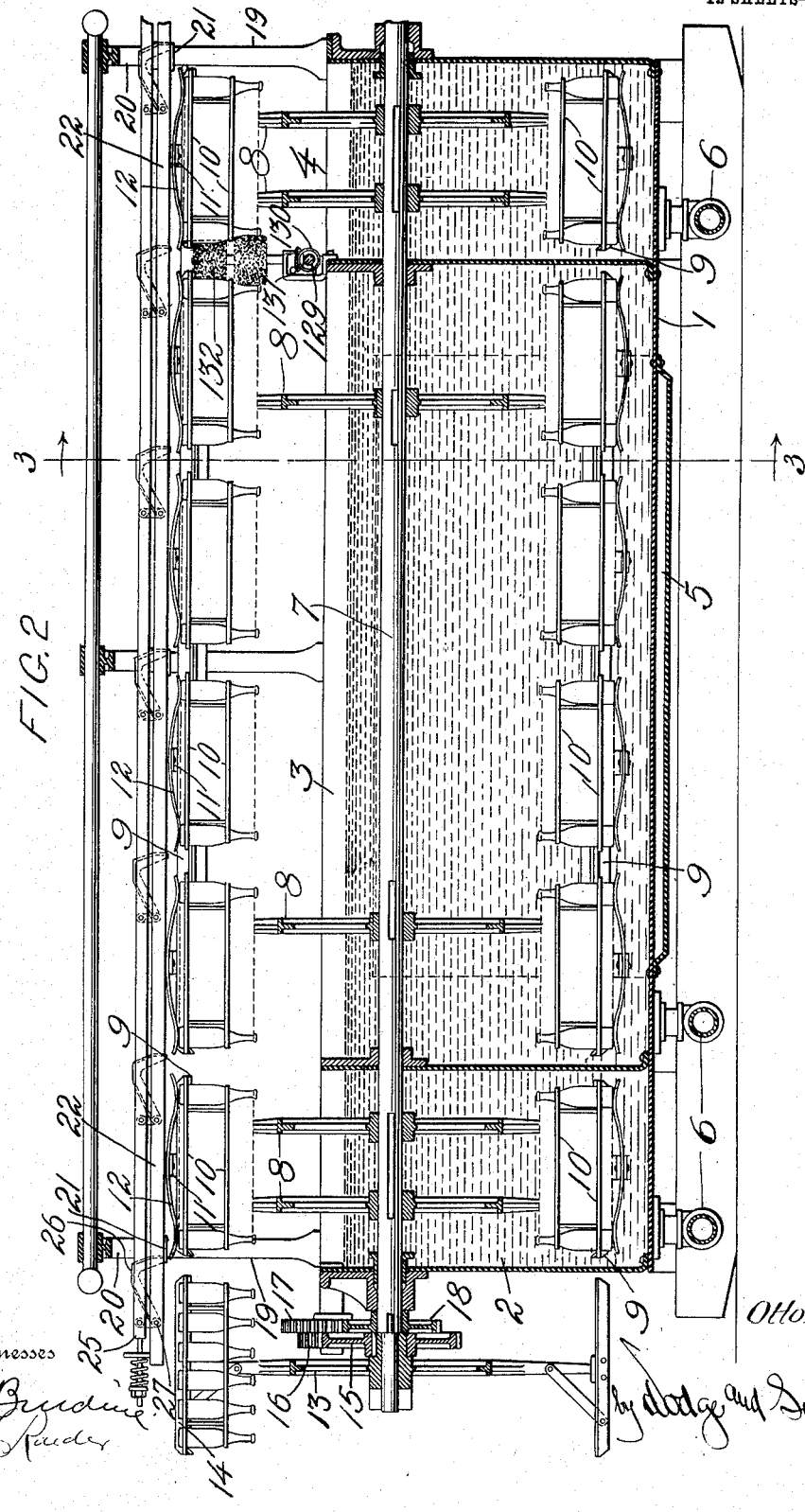
Figure 3:
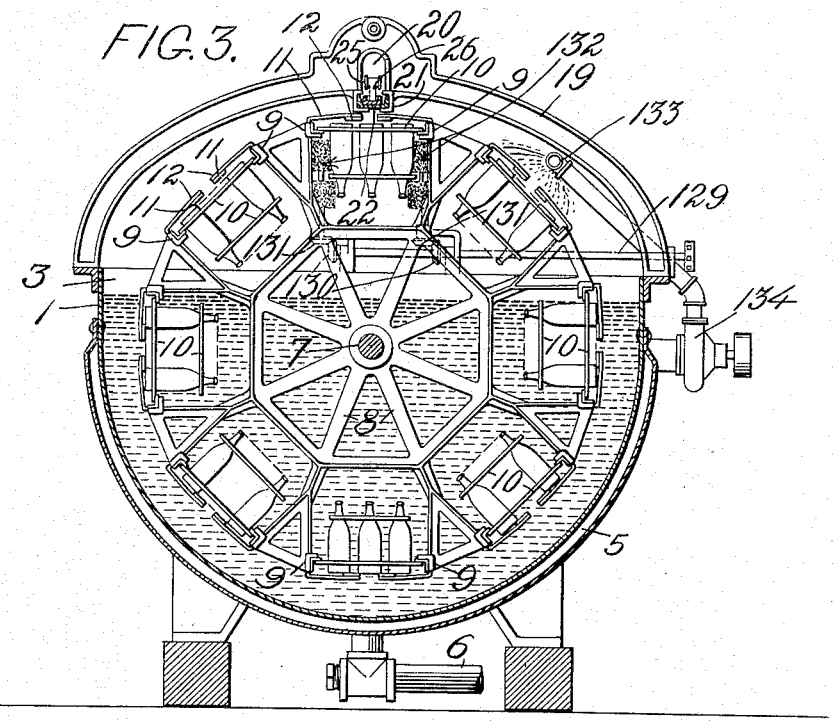
Figure 4:
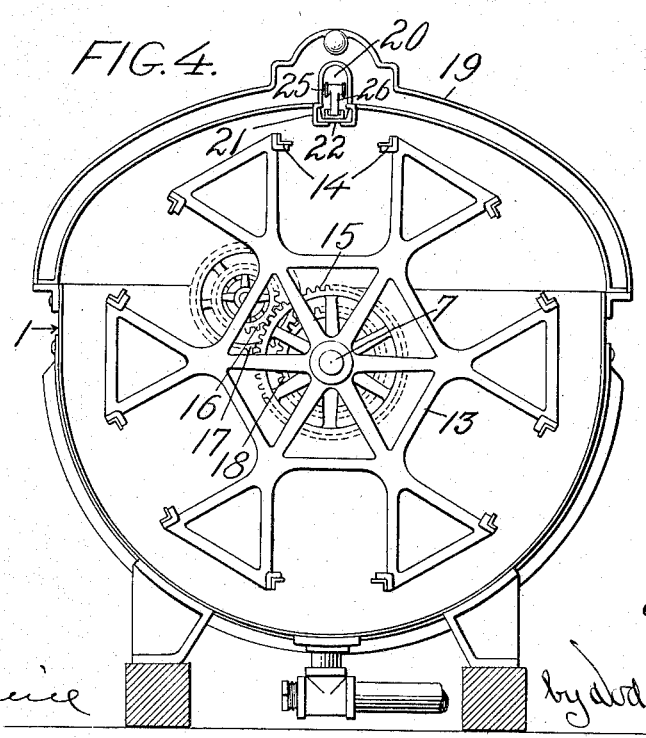
Figure 5:
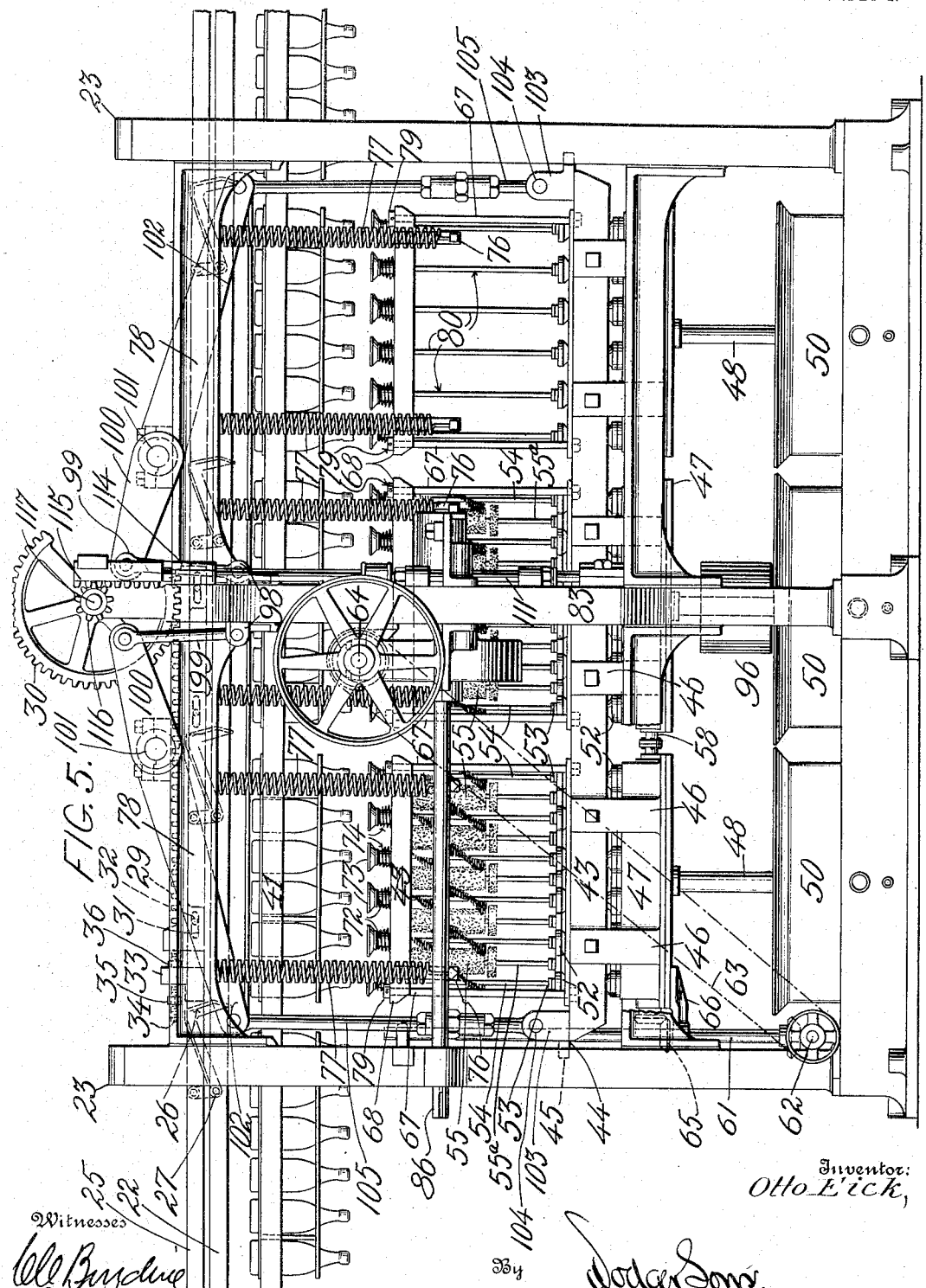
Figure 6:
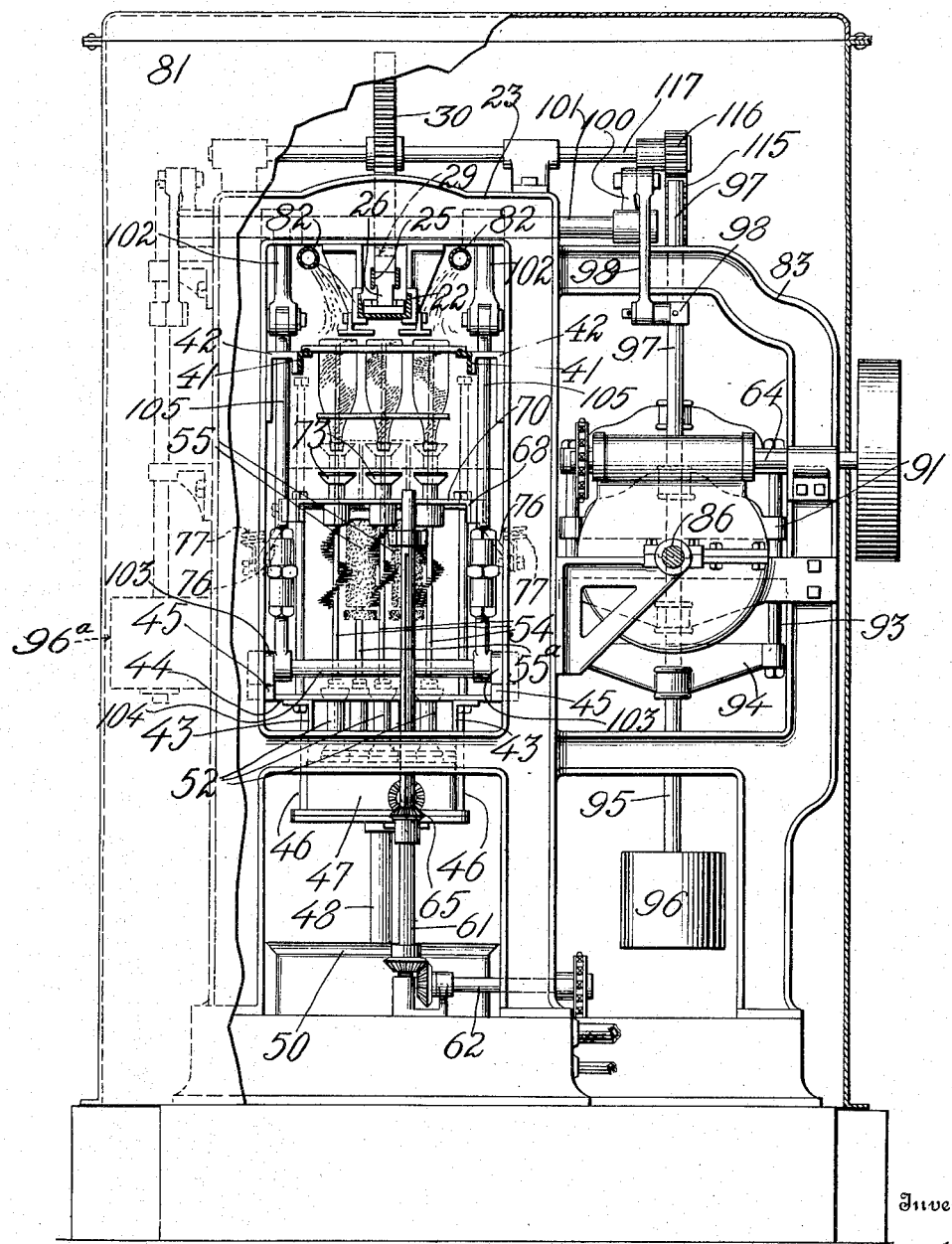
Figure 7:
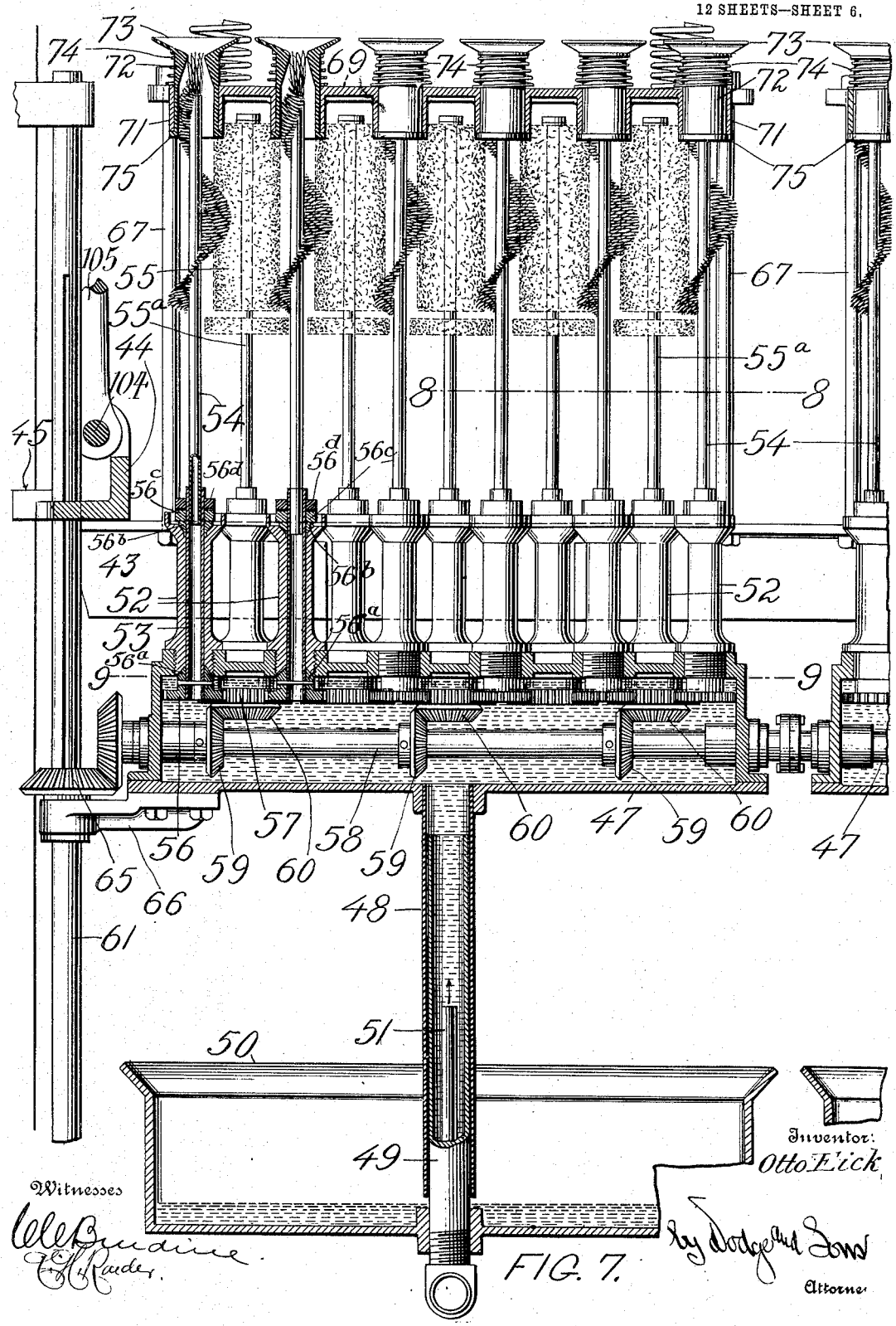

My invention pertains to an improved apparatus for cleansing bottles, the construction and advantages of which will be hereinafter set forth, reference being had to the annexed drawings, wherein:

Figure 1 is a side view of the apparatus, one portion thereof being shown partly in section; Fig. 2 a vertical sectional view of the soaking apparatus, shown on a somewhat enlarged scale; Fig. 3 a transverse vertical sectional view, taken on the line 3—3 of Fig. 2, and looking in the direction of the arrow; Fig. 4 an end elevation of the forward portion of the soaker, showing the crate-presenting mechanism; Fig. 5 a side elevation of that portion of the machine which contains the brushes that pass up into and between the bottles and which may, for the purposes of description, be termed the "spindle mechanism", the inclosing casing being omitted; Fig. 6 an end elevation thereof, the inclosing casing being partly broken away; Fig. 7 a vertical sectional view of the brush-spindles and outside brushes, together with the driving mechanism therefor, the section being taken on the line 7—7 of Figs. 8 and 9; Fig. 8 a sectional plan view, looking down on the top of the bottle mouthpieces and brushes, the sectional portion at the right being taken upon the line 8—8 of Fig. 7; Fig. 9 a horizontal sectional view, showing the gears employed for driving the various spindles and brushes, the section being taken upon the line 9—9 of Fig. 7; Fig. 10 a side elevation, partly broken away, showing a portion of the rack-advancing mechanism; Fig. 11 a top plan view thereof; Fig. 12 an end elevation of the driving mechanism employed for imparting a step-by-step movement to the supporting shaft in the soaker, as seen when looking toward the spindle mechanism; Fig. 13 a like view, showing the mechanism when looking toward the soaker; Fig. 14 a detail sectional view, showing the driving disk and the actuating gear: Fig. 15 a side elevation of the mechanism employed for raising and lowering the spindles and brushes into and out of contact with the bottles, the parts being shown as elevated and the brushes as having passed into the bottles; Fig. 16 a similar view, the parts being shown in their lowermost positions; Fig. 17 a vertical sectional view of said parts, the operating cam being shown in full; Figs. 18 to 20 inclusive perspective views of the operating cam; Fig. 21 a side elevation of the mechanism employed for automatically opening and closing the valves which admit water and air under pressure to the spindles; Fig. 22 a top plan view thereof; Fig. 23 an end elevation of the same parts; Fig. 24 an elevation of a modified form of driving mechanism interposed between the power shaft and the soaker-shaft; Fig. 25 a like view of said parts, looking in the opposite direction, or toward the soaker; and Fig. 26 a side view of said driving mechanism.

The main object of the invention is to provide a simple and efficient machine, preferably driven from a single source of power, for soaking bottles and thoroughly washing the inner and outer portions thereof so that as the bottles leave the machine they will be clean upon both their interior and exterior surfaces.

Another object of the invention is to provide mechanism for automatically presenting the bottles to the intake of the soaker and to thereafter forward the crates which hold the bottles from one compartment to another in the soaker and to discharge the same from the soaker.

A further object of the invention is to provide means for automatically presenting the bottles to the intake of the soaker, traversing the bottles through the soaker, automatically transferring them from the soaker to the spindle or brush mechanism, and advancing them through said mechanism.

It is also an object of this invention to provide means for thoroughly cleaning the outer tier of bottles in the crates as they are about to emerge from the soaker, and to subject the bottles to a spray of water in order to remove any loosened labels which may adhere thereto.

A still further object of the invention is to provide means for automatically bringing the brushes into and out of operative relation with the bottles which are held in the crates above said brushes.

One object of the invention, also, is to provide a simple and efficient mechanism for rotating the brushes, both those which enter the bottles and those which pass between the bottles that are held in the crates.

Another object is to provide means whereby water commingled with air under pressure may be forced into the bottles, and act in conjunction with the rotatable brushes held within the same to thoroughly clean the interior of the bottles.

A still further object is to provide means actuated by the crates as they are passed from the machine for automatically opening and closing the water and air supply pipes that lead to the gear-box into which the ends of the rotatable spindles extend.

With these and other objec s in view I will now describe the preferred form of the invention, reference being had to Figs. 1 to 23 inclusive.

The machine, stated in general terms, comprises a soaking vat, preferably formed with a series of separate chambers, means for presenting the bottles to said soaker and passing them successively from one chamber to ano her and finally carrying the same from said soaker into the spindle mechanism, and means for moving the spindle-brushes into and out of contact with the bottles as they come to rest over said spindle-brushes.

Referring more particularly to Figs. 1 to 4, 1 denotes the vat or tank of the soaker, said tank in the form shown being provided with three separate chambers or compartments 2, 3 and 4. As will be noted upon reference to Figs. 3 and 4, the tank is substantially semicircular in cross-section, and the portion thereof adjacent to the central compartment, 3, is provided with a steam-space or chamber 5, for the puropse of keeping the contents of said compartment at the desired temperature. Suitable outlets, 6, are provided for drawing off the contents of the compartments and admitting water or other fluid thereto from time to time as required. Extending longitudinally through the tank at a point slightly below the upper edge thereof is a shaft 7 which extends beyond the ends of the tank, suitable stuffing-boxes being provided to prevent leakage of water or other cleansing fluid around said shaft. Secured upon shaft 7 within each of the chambers or compartments 2, 3 and 4, is a pair of spider frames or carriers 8, the form of said frames being best illustrated in Fig. 3. Each frame is provided with what may be termed a series of pockets around its periphery, and the frames in each compartment are connected to each other by rails 9. Each pair of rails is adapted and designed to form a support for the outwardly-extending flanges of the bottle-holding crate members 10. Projecting inwardly from each side of the pockets and overlying the bottles supported by the crates are arms 11, the innermost end of each arm carrying a spring plate 12. As will be seen upon reference to Fig. 3, and more particularly to the crates held in the lower portion of said carrier-frame 8 the members 12 contact with the bottles and thus prevent the crates and the bottles from falling from the spider frames or carriers.

As will be noted from the foregoing description, it is intended that the bottles shall be held in suitable racks and the racks and bottles passed through the machine. In order to present the racks automatically to the soaker or to the uppermost pocket in the spider-frame or carrier which rotates within the compartment 2, I provide a crate-presenting mechanism, which is carried by the shaft 7 and is periodically rotated to bring a crate in line with the pocket, so that the crate may be moved from the presenting device into position in said carrier. The presenting mechanism comprises a spider frame 13, having pockets formed therein similar to the pockets in the carriers 8, with supporting rails or arms 14 arranged at each side of the pockets and adapted to hold and support a crate, as shown in Figs. 1 and 2. Said spider frame is loosely mounted upon the outer end of shaft 7, and secured to the inner portion of its hub is a gear 15, meshing with a pinion 16. The pinion is mounted upon a stud-shaft extending outwardly from the tank and is fast to and rotates with a gear 17, which in turn meshes with a pinion 18 keyed or splined to the shaft 7.

As will be noted upon a comparison of Figs. 3 and 4, the carriers within the tank or vat contain eight pockets, or in other words, are adapted to hold eight crates, while the crate-presenting wheel or frame 13 is provided with six pockets, so that said presenting frame must rotate at a speed greater than that of the carriers within the tank. The parts are so proportioned that each time one of the pockets in the carriers reaches its uppermost position, or in line with the crate-advancing mechanism (hereinafter described) one of the pockets in the crate-presenter will stand in alinement therewith, and also in alinement with the crate-advancing mechanism. The attendant places the crates upon the rails 14 of the carrier from time to time.

Extending from side to side of the tank are suitable arched frames 19, each provided with a recess 20 at the central portion thereof (see Figs. 3 and 4). Suitable brackets 21 are arranged at the lower portion of said recess 20 and form a support for the lower trough-shaped member or shifter slide-bar 22 of the crate-advancing mechanism (see Figs. 3 and 4). Said mechanism, as will be noted upon reference to Fig. 1, is coextensive of the whole apparatus, that is is to say, it extends over the crate-presenting mechanism, over the soaking portion of the apparatus, and through and beyond the spindle apparatus. The frames 23 of the spindle mechanism (see Figs. 10 and 11) are likewise provided with brackets 24 (Fig. 6) which form a support for the shifter slide-bar 22 as the same passes from said spindle portion of the machine.

Bars 25 are placed above the shifter slide-bar 22 and hooks or pawls 26, fulcrumed at 27, are pivotally connected at their upper ends to said bars 25, as will be best seen upon reference to Fig. 10. The depending ends of the hooks pass through openings 28 formed in the lower portion of the member 22 and normally stand in the path of travel of the crates. A rack 29, meshing with a sector gear 30, is mounted between and carried by the bars 25. The lower portion of said rack is provided with a series of elongated slots 31, through which extend pins 32. These pins prevent the rack from moving up or down but permit a slight longitudinal movement thereof with reference to the bars 25. A bracket 33 is secured to the bars 25, the upstanding end of said bracket being provided with an opening through which passes a threaded stem or rod 34, secured to the rear end of the rack 29. Stop nuts 35 and 36 are secured upon the stem or rod on opposite sides of the bracket and permit a slight endwise movement of the rack independent of the bars 25. Rod 37 is secured to the rear ends of the bars 25, and extends through an upstanding arm 38 carried by the member 22, a spring 39 encircling the outer end of the rod and bearing, respectively, against the arm and a nut 40, mounted upon the outer end of the rod. Said spring serves to normally draw the bars 25 rearwardly and to rock the hooks or pawls upon their fulcrums 27, thereby elevating the lower ends of the hooks and withdrawing them out of line with the crates.

In the position of the parts shown in Fig. 10 the sector gear 30 has been moved slightly in the direction indicated by the arrow, which movement advances the rack 29, bringing the nut 35 into contact with the adjacent face of the bracket 33 and thereby moving the bars 25 forwardly, independent of the trough-shaped member 22, at the same time placing spring 39 under compression and swinging the lower ends of the hooks or pawls down into operative relation with the crates, which are below said parts. Further rotation of the gear 30 will cause an advance of the bars 25 and the slide-bar 22 in unison, and such movement will continue until the crates have been advanced the necessary distance, which is slightly in excess of the length of one of the crates. Through mechanism hereinafter set forth the sector-gear is then rotated in the opposite direction, the effect being that the spring 39 will immediately draw the bars 25 rearwardly, independent of the member 22, causing the hooks to be elevated. As this takes place the nut 36 comes into contact with the bracket 33 and the bars 25 and member 22 move backwardly into their original positions, and the hooks are again ready to be depressed to advance the crates another step forward. It will thus be seen that as one of the crates carried by the presenting wheel or frame 13 is brought into alinement with the crate or rack-advancing mechanism the crate will be engaged by the outermost hook and passed into the soaker, while the other crates within the soaker which stand in alinement with said rack-advancing means will be moved forwardly one step. At the same time the uppermost crate in the compartment or chamber 4 will be passed outwardly therefrom toward the spindle mechanism, while a crate will be advanced into or upon the tracks 41 which are mounted on brackets 42 secured to the frames 23 of the spindle mechanism, said tracks 41 extending over to the point of discharge from the soaker (see Fig. 1.) Should there be any crates or trays in said spindle mechanism they will, of course, be advanced one step therein and the last tray or crate carried beyond the last series of spindles.

The construction of the spindle mechanism will be best understood upon reference to Figs. 5 to 9 inclusive. In said mechanism two series of internal and external spindle-brushes and a final series of rinsing spindles are used, the former being rotated while the latter remain stationary and are merely inserted into and withdrawn from the bottles just before they pass from the machine.

Mounted within the open portions of each frame 23 is a frame or bed composed of two longitudinally-disposed angle-irons 43, the ends of which are connected together by a pair of transversely-arranged plates or end pieces 44 (Figs. 6, 7 and 8), said cross-pieces or plates being provided with lugs 45 which bear against the sides of the frames and serve to guide the bed as it is moved up and down within the frame to raise and lower the spindles. Located below and connected directly with the side members 43 of the frame by vertically-disposed arms 46 are boxes or hollow chambers 47 which serve to support the spindles and their driving gears, and also afford means for the passage of air and water from the main supply to the spindles. Each of these boxes is the same in construction and a description of one and its attendant parts will, therefore, suffice, they being best shown in Figs. 7, 8 and 9. As will be noted upon reference more particularly to Fig. 7, the box or chamber is provided with a downwardly-extending pipe 48, which telescopes with a second pipe 49 connected to the water-supply in a manner hereinafter set forth. Pipe 49 extends upwardly through a basin or receptacle 50 arranged beneath the box or chamber 47, and is designed to catch the waste water which passes from the spindles and bottles being cleaned. A third pipe, 51, extends upwardly into the pipe 49 and is connected with a source of air under pressure. As will be hereinafter set forth in detail, air and water are designed to be automatically turned on when the spindles are entering the bottles so that the air and water will be forced through the spindles and into the brushes, and when the spindles are withdrawn from the bottles the water supply will be automatically turned off. By the employment of air and water much more effective results are obtained than if water alone were forced through the spindles. The water is atomized to a certain extent, the air tending at all times to force the water out of the bottles, which are thus prevented from becoming filled (as is the case when water alone is used) and destroying in a measure the effectiveness of the work of the brushes.

The upper face of the box 47 is provided with a series of threaded openings in which are secured hollow posts or bearing members 52, said members forming supports for the lower tubular sections 53 of the spindles and brushes. As will be seen upon reference to Fig. 7, the bearing members or supports 52 are provided at their upper and lower ends with beveled or cone-shaped faces, and the hubs of the gears 56, hereinafter referred to more specifically, are provided with tapered or cone-shaped ends 56$^a$. These tapered portions bear against the lower cone-shaped faces of the bearing members 52. A cone 56$^b$ is mounted upon each spindle at the upper end of the bearing member, and is seated against the conical face at the upper end of said member. This cone 56$^b$ is held in place by a washer 56$^c$ and a nut 56$^d$. By this arrangement no packing is required, and while the spindle is permitted to run freely, one or the other of said cone-shaped members 56$^a$, 56$^b$ will be thrown into contact with its correspondingly-shaped bearing member 52 as the box 47 is raised or lowered in the act of introducing the spindles into or withdrawing them from the bottles.

In the construction shown eighteen spindles are provided, the machine being arranged to operate upon eighteen bottles at one and the same time. It is, therefore, necessary to have eighteen interior spindles and spindle-brushes, and in conjunction therewith ten outside brushes are provided. As will be seen upon reference to Fig. 9, the spindles designated by the reference numeral 54 (each of which is attached to a tubular member 53) are arranged in three parallel rows, six in each row, while the outside brushes 55 are arranged in two rows of five each and are carried upon spindles or upright tubular members 55$^a$. To the lower end of each spindle 54 is secured a gear 56 which meshes with a somewhat larger gear 57, carried at the lower end of the adjacent outside brush spindle.

A shaft 58 extends through the box 47 and is provided with bevel gears 59 which in turn mesh with similar gears 60 secured to or formed as a portion of the large gears 57 which overlie the shaft. As will be seen upon reference to Figs. 5 and 7, the shaft 58 extends from one box or chamber 47 to the next, the shaft being made sectional so that it may be disconnected if desired. Motion is imparted to shaft 58 from a vertically-disposed shaft 61, which in turn receives its motion from a countershaft 62, driven by a chain 63, that extends from a sprocket-wheel on the shaft 62 to a similar wheel upon the main driving shaft 64, see Fig. 6. A bevel gear 65 upon the vertical shaft 61 and meshing with a gear upon the shaft 58 is carried on a suitable bracket 66, secured to the under face of the box or chamber 47, a spline-way being formed in said shaft 61, in order to permit gear 65 to be raised and lowered with the box and still continue to rotate.

Extending upwardly from the bed adjacent to each series of spindles or brushes are four vertically-arranged guide-rods or posts 67. These rods serve to properly position the mouth-piece carrier or frame which, as will be seen upon reference to Figs. 7 and 8, is composed primarily of two longitudinally-extending side members or bars 68, a series of smaller longitudinally-disposed intermediate bars or members 69 and cross-bars 70. An opening is formed at the intersection of each of the cross-bars 70, and a downwardly-extending collar 71 is provided at such point. Said collar forms the bearing for the mouth-piece 72, the upper end of which is provided with a funnel-shaped extension 73. A spring 74 encircling the mouth-piece serves to hold the same in an elevated position, complete withdrawal of the mouth-piece being prevented by a collar 75, secured to the lower end thereof, and which bears against the collar 71. These mouth-pieces, as will be seen upon reference to Fig. 7, stand in direct alinement with the spindles 54, the upper end of each spindle and the brush or wiper carried thereby normally extending into the lower end of a mouth-piece ready to be inserted into a bottle-neck when the bottle is properly positioned with relation to the mouth-piece.

Extending downwardly from each corner of the mouth-piece plate or carrier is an arm 76, and projecting upwardly from the lower end of each arm is a relatively heavy coiled spring 77, the upper end of each spring being secured to intermediate braces 78, for the frames 23. These springs tend to keep the mouth-piece plate in an elevated position, as shown in Fig. 5, against collars 79 secured to the upper ends of the vertically-disposed rods or posts 67. As the spindles are elevated in the manner about to be set forth, the mouth-piece plate or carrier and the mouth-pieces will, of course, be moved upwardly therewith until the mouth-pieces come into contact with the mouths of the bottles which stand directly above the same. Each mouth-piece will accommodate itself to a bottle, the springs 77 serving to hold the mouth-piece plate as a whole, and consequently the mouth-pieces, in proper position with relation to the various bottles in the rack. The spindles and brushes, however, will continue their upward movement, the spindles passing into the mouths of the bottles and the brushes 55 going through the openings in the mouth-piece plate formed between the bars 69 and 70, and between the bottles carried by the crate.

As will be seen upon reference to Fig. 5, and as hereinbefore pointed out, the outside brushes are omitted at the discharge end of the machine, and a series of plain spindles 80, without brushes or the like, is employed at this point to merely rinse the interior of the bottles.

It is designed, of course, as will be seen upon reference to Fig. 6, to inclose the spindle portion of the machine and to this end a casing 81 is employed.

Spray pipes 82, also shown in Fig. 6, may extend lengthwise of the machine, water being ejected therefrom onto the bottles while they are being operated upon, or as they are passed through the machine. These pipes, however, are not essential to the present construction.

In order to raise and lower the frame or bed with its attached parts, and also to automatically operate the rack-advancing means, the following mechanism is employed, reference being had more particularly to Figs. 5 to 8 and 15 to 20 inclusive. The bearing of the main driving shaft 64 is supported upon a supplemental frame 83, extending outwardly from the middle of the frames 23, the shaft carrying a worm 84 (Fig. 17) which in turn meshes with a worm-wheel 85 secured upon a shaft 86. Said shaft projects outwardly in each direction beyond the gear-casing 87 and upon one end is secured a cam 88, of the form best shown in Figs. 18 to 20 inclusive. Secured to one side thereof is a roller 89, located at the outer edge of the cam and at the beginning of the cam-face 90, which face extends through an arc of 90°. Roller 89 is designed to work in conjunction with the under face of a cross-bar 91, while the face 90 coacts with a roller 92, carried by said cross-bar 91. The cross-bar, as will be seen upon reference to Fig. 16, is connected by rods 93 to a similar cross-bar 94, said bars and rods in effect forming a frame which coacts with the cam and is periodically raised thereby and held in such position. A rod 95 extends downward from the member 94, and a weight 96 is secured to the lower end of said rod, the weight serving, in conjunction with a second weight (hereinafter referred to), to counterbalance the weight of the spindle frame and its attached parts. Extending upwardly from the cross-bar or member 91 is a rod 97, which passes through an opening in the supplemental frame 83 and is guided thereby. Secured to said rod 97 is a block 98 to each end of which is pivotally connected a link 99. The upper ends of the links are also pivotally connected to the outer ends of crank-arms 100, said arms being in turn rigidly secured to shafts 101 mounted in suitable bearings and extending transversely of the machine, as will be seen upon reference to Fig. 6. Two shafts 101 (see Fig. 5) are employed, to each of which is secured a pair of arms 102, the ends of the arms projecting outwardly in line with the end of the frame upon which the spindles and attendant parts are mounted. Extending upwardly from each end of each of the cross members 44 is a lug 103 in which is secured a cross-bar or rod 104. Pivotally connected to said rods and to the outer ends of the arms 102 are adjustable links or rods 105. It will thus be seen that the frame composed of the members 91, 93 and 94, which may be termed the "spindle and brush elevating frame," is alternately raised and depressed through the action of the cam 88, weight 96 and a supplemental weight 96ª which, as shown in Fig. 6, is connected to the shafts 101 through suitable connections. With the parts in the positions shown in Fig. 15 the frame is depressed and as a consequence the block 98 is lowered and the arms 102 elevated through the connections above described. At such time the frame carrying the spindles and the gear boxes will be elevated and the brushes brought into and between the bottles, as shown in said figure. The parts will remain in this position during a quarter revolution of the cam and will then be gradually raised from the position shown in Fig. 15 to that illustrated in Fig. 16, in which latter position they will remain until the cam has made another quarter of a revolution, when the frame will again gradually descend and come into the position shown in Fig. 15.

The cam 88 is provided upon the face opposite roller 89 with a lateral projection or rib 106 which, as will be seen upon reference to Fig. 18, is provided with an extension or projection 107. The cam also carries a second roller 108, which roller, rib and projection coact with a second frame composed of the cross members 109, 110 and connecting bars or rods 111. A guide rod 112 extends downwardly from the lower member 110 into a suitable bearing, while the upper member 109 has secured to it a rod 113 which passes through a bearing 114 and carries a rack 115 at its upper end. Said rack in turn meshes with a pinion 116, mounted upon a shaft 117, upon which the sector gear 30 is likewise mounted. As will be seen upon reference to Figs. 15 and 16, the upper member 109 of the frame is cut away, as at 118, to permit the extension 107 to pass said frame without acting thereon. The lower member 110 is not, however, cut away and the extension 107 comes into contact therewith and imparts to the frame a slight quick downward movement, in order to depress the same and consequently actuate the sector gear 30, to move the rack 29 rearwardly and thereby positively elevate the ends of the hooks or pawls 26. This arrangement is employed in order that the hooks may be entirely removed from the path of travel of the crates before the latter begin their advance movement. The frames actuated by the cam move in alternation, the rack-advancing frame, or that composed of the members 109, 110 and 111, remaining at rest while the spindle or brush elevating frame is being raised and lowered. The latter frame remains idle while the other frame is being raised to first depress the hooks, advance the same, and then withdraw them from the line of travel of the crates, preparatory to the spindles and brushes again coming into action.

In order that the carriers of the soaker and the rack-presenting mechanism may be timed to operate in unison with the spindle-actuating mechanism, motion is imparted to the shaft 7 from the shaft 86 by the mechanism shown in detail in Figs. 12 to 14 inclusive. Secured to the outer end of shaft 86 is a crank-arm 119, to which is pivotally connected a pitman rod 120, said rod in turn being pivotally connected to the lower end of a rack 121 mounted in a suitable guide or support 122. Said rack meshes with a sector gear 123 swiveled or journaled upon the hub 124 of a notched disk or wheel 125, the latter in turn being keyed fast to the soaker shaft 7. The sector gear 123 has pivotally secured to it a pawl 126, which is normally held in engagement with the teeth of the disk 125 by a spring 127. A spring-pressed locking pawl or dog 128 is mounted upon the frame of the machine and prevents retrograde movement of the disk and consequently of the shaft 7. As the crank-arm 119 rotates in the direction indicated by the arrow in Fig. 12 the rack 121 will be moved upwardly in its way or guide, and the pawl 126 being in engagement with a tooth of the disk, will rotate the latter and consequently the shaft 7, until the crank-arm has moved through an arc of 180°. At such time the dog 128 will have passed into one of the notches of the disk, locking the same and permitting the rack and sector gear to move in the opposite direction independent of the disk and consequently independent of the shaft 7. It will thus be seen that the entire mechanism is driven from a single source of power and the parts are so timed that they operate in proper sequence and without the slightest interference with each other.

From the description of the spindle and brush mechanism above given and upon reference to Fig. 8, it will be noted that the brushes 55 do not act upon a portion of the faces of those bottles which are around the edge of the crate, and to subject these surfaces to a brushing action I employ a pair of brushes, shown in detail in Figs. 1, 2 and 3. Mounted upon the partition intermediate the chambers or compartments 3 and 4 is a shaft 129, carrying bevel gears 130, which in turn mesh with similar gears 131 carried at the lower ends of the spindles for the brushes 132. As will be noted upon reference to Fig. 3, these brushes stand in direct alinement with the outermost bottles upon each side of the crate as the same is advanced from the chamber or compartment 3 to chamber 4, so that the outer faces of the bottles in each outer tier will be subjected to a brushing action as the crate is traversed from one compartment to the next. It will also be seen upon reference to Fig. 2 that the outermost faces of the bottles at the ends of the crates will likewise be acted upon by the brushes as the carriers are moved around step by step; that is to say, when a crate, as the uppermost in Fig. 3, is moved from that position downwardly in the direction of the arrow, the bottles will come into contact with the brush at the left and the bottles in the carrier which is ascending or assuming a vertical position will come into contact with the brush at the right. Thus the entire outer surface of each bottle with the exception of the bottom is subjected to a brushing action.

For the purpose of removing any labels or other adhering matter from the bottles as they are passing out of the soaker into operative position with relation to the spindle mechanism, I employ a spray pipe 133, shown in Fig. 3, said pipe occupying a position above the last chamber or compartment and projecting the water upon the bottles after they have emerged from the liquid in the tank. A centrifugal pump 134 may be connected to the spray pipe 133, in order to project the water upon the bottles with sufficient force. Said pump and the shaft 129 may be driven from any suitable source.

In order that there may be no waste of water and compressed air, it is designed that the same shall be automatically admitted to the spindles and brushes, and to this end the mechanism shown in Figs. 21 to 23 inclusive is employed. The main water supply pipe 135 is provided with a weighted valve 136 which normally closes the same. The main air supply pipe 137 is provided with a similar valve, 138. The ends of the valve-levers project outwardly into alinement with an arm 139 mounted upon and carried by the rod 95 to which the weight 96 is attached. Each of the pipes 49 and 51 hereinbefore referred to is connected by a branch to said main pipes 135 and 137, and each of said branches is in turn provided with a normally-closed valve connected to a single operating rod 140, said rod being pivotally connected to a crank arm 141 secured to a shaft 141ª which carries an arm 141ᵇ at its upper end, said arm being normally pressed inward into the path of travel of the trays. As the rod 95 is lowered, the arm 139 comes into contact with the levers of the valves 136 and 138, and opens said valves. This takes place when the spindles are elevated or about to be raised, so that no water or air can pass into the spindles until they are in proper position with relation to the bottles. Again, no water can pass through any of the spindles unless a crate be in position over the spindles supplied by the pipes 49 and 51, for until a crate has been moved inwardly the arm 141ᵇ stands in the position shown at the right in Fig. 22, whereby the valves in said branch pipes are maintained closed while the valves in the other branch pipes are held open, inasmuch as crates are in operative positions with relation to the arms 141ᵇ.

In Figs. 24 to 26 inclusive is shown a slightly modified form of driving mechanism interposed between the main driving shaft and the soaker shaft. In the forms hereinbefore described the crates are shown as carrying eighteen bottles. In the form illustrated in Figs. 24 to 26 the apparatus is designed to handle crates holding twelve bottles; consequently, a different speed must be maintained between the main driving shaft and the shaft which extends through the soaker and upon which the crate-carriers or frames are supported. The main driving shaft, designated in Fig. 24 as 64ª, carries a worm which meshes with a worm-gear, as in the other construction, and imparts motion to a longitudinally-extended shaft 86ª. Secured to said shaft is a mutilated gear-wheel 142, which coacts with a smaller gear 143 carried by a countershaft 144. Said gear 143 is provided with an enlarged tooth 145 which, under certain conditions, bears against the idle or blank portion of the gear 142. Said gear rotates continuously in the direction indicated by the arrow in Fig. 24 and will make a quarter of a revolution before imparting motion to the gear 143. When the tooth designated as 146 of the gear 142 comes in contact with the tooth 145 of the smaller gear 143 the two gears will be brought into mesh with each other and the smaller gear will make a complete revolution and then come to rest. Secured to the opposite end of the countershaft 144 is a pinion 147 which meshes with a gear 148 carried by the soaker shaft 7. It is evident that the intermittent motion of the gear 143 will, through these connections, be imparted to the soaker shaft.

In order to insure proper alinement of the carriers with reference to the crate-presenting and advancing mechanisms, I preferably employ a stop or holding device in connection with the gear 148. Secured to the shaft 86ª is a cam 149 which stands in alinement with a roller 150 mounted upon a lever 151 fulcrumed at its upper end upon a bracket 152 secured to the soaker frame. The lower end of the lever 151 carries a swivel block 153, through which extends a rod 154, provided with adjusting nuts 155 and 156 arranged upon opposite sides of the swivel block so that the rod may be adjusted longitudinally through said block. The outer end of the rod 154 is provided with a hook or finger 157, which coacts with studs 158 projecting outwardly from the gear 148. When said gear has been rotated and comes to rest with the openings in the carriers in alinement with the rack-presenting mechanism and the rack-advancing mechanism, the stop rod 154 will have been moved over into the position shown in Fig. 25, with the finger 157 against one of the studs 158. The cam will, of course, move the rod a sufficient distance to insure the parts being brought into alinement, notwithstanding any lost play which may take place between the gears. The rod also serves to hold the gear 148, and consequently the soaker shaft, against retrograde movement.

It is evident that so far as the broad and underlying invention is concerned various changes may be made in the mechanism. Thus other forms of driving devices for the machine may be employed, so long as they work in unison and serve to rotate the carriers within the soaker and bring them to rest in such position that the trays may be advanced therethrough and into operative relation with the spindle mechanism.

With the apparatus herein described bottles of various lengths may be operated upon, the yielding mouthpiece plates adjusting themselves to either pint or quart sizes.

The terms "brushing" and "brushing mechanism" as employed in the claims are to be given a broad interpretation and are intended to include any device which has a wiping or brush-like action.

While in the foregoing specification I have described the apparatus as being designed and used for the cleansing of bottles, it is, of course, understood that the claims are directed to the several features of construction and are intended to cover the same, for all purposes or uses for which they are adapted.

No claim is made herein to the generic invention of employing water and air in connection with the spindles, as such subject-matter is included and claimed in my copending application Serial No. 254,861, filed April 10, 1905.

Having thus described my invention, what I claim is:

1. In an apparatus of the character specified, the combination of a tank; a carrier arranged to support a series of bottle-holding trays or racks; means for periodically rotating said carrier and thereby causing the bottles to be filled and emptied; a series of bottle-brushes or spindles arranged to one side of said tank; means for raising and lowering said spindles or brushes into operative relation with the bottles carried by a tray; and means for advancing the tray with the bottles therein from the carrier within the tank into operative relation with said spindles or brushes.

2. In an apparatus of the character specified, the combination of a soaking tank; a bottle-brushing mechanism located to one side thereof; a track extending from said tank over the bottle-brushing mechanism; means for periodically advancing the bottle-holding racks or trays from the tank onto and along said track; and means for bringing the bottle-brushing mechanism into operative relation with the bottles thereover when the tray-advancing mechanism is at rest.

3. In an apparatus of the character specified, the combination of a soaking tank; means contained within said tank for supporting a bottle-holding rack or tray; a brushing mechanism working in conjunction with said tank and arranged to act upon the interior and exterior surfaces of each and every bottle carried by said tray; and means for transferring the tray from the tank to the brushing mechanism.

4. In an apparatus of the character specified, the combination of a soaking tank; means contained therein for supporting a bottle-holding rack or tray; a pair of brushes arranged above said tank and adapted to act upon portions of the exterior surfaces of the outermost bottles carried by said tray as the tray is passed above the tank; a series of spindle brushes arranged to act upon the interior surfaces of the bottles and on the exterior surfaces of the bottles which are not acted upon by the first pair of brushes, means for securing a relative movement of the bottles and brushes to cause the latter to enter the bottles; and means for transferring the rack with the bottles therein from the tank to said spindle-brushes.

5. In a machine of the character specified, the combination of a tank; a shaft extending therethrough; a series of carriers mounted upon said shaft and rotatable therewith whereby the bottles carried by the tank are alternately filled and emptied; a series of bottle-cleaning devices arranged to one side of the tank; a track extending from said tank and over the bottle-cleaning devices; means for periodically advancing the trays with the bottles therein along the carriers onto the track and over the bottle-cleaning devices; means for raising and lowering the bottle-cleaning devices while the trays with the bottles therein are at rest; and means for periodically rotating the shaft within the tank.

6. In a machine of the character specified, the combination of a tank; means contained within said tank for supporting a series of bottle-holding racks or trays; means for advancing said trays along the supporting means and through the tank; and independent rotatable means located outside of the tank for presenting a tray to said advancing means.

7. In a machine of the character specified, the combination of a tank; means contained within said tank for supporting a series of bottle-holding racks or trays; means for advancing said trays along the supporting means step by step; and independent means exterior of the tank for bringing the trays into alinement with said tray-advancing means.

8. In a machine of the character specified, the combination of a tank provided with a plurality of chambers or compartments; means contained within said compartments for supporting a series of bottle-holding racks or trays; means extending throughout the length of the tank for advancing the trays along the supporting means from one chamber to the next; and means exterior of said tank and moving in a path substantially at right angles to the advancing means for bringing the trays into alinement with said advancing means.

9. In a machine of the character specified, the combination of a tank provided with a plurality of chambers or compartments; rotatable means contained within each of said compartments for supporting a series of bottle-holding trays or racks; and rotatable means located without said tank for supporting a series of bottle-holding racks which are to be moved into the tank.

10. In a machine of the character specified, the combination of a tank; rotatable means contained within said tank for supporting a series of bottle-holding racks; and rotatable means located without said tank for carrying racks into line with said rack-supporting means.

11. In a machine of the character specified, the combination of a tank provided with a plurality of chambers or compartments; rotatable means located within each of said chambers and adapted to support a series of bottle-holding racks; a rotary rack-presenting device located without the tank; gearing interposed between said rotatable supporting means and said device, whereby the two are caused to work in unison; and means arranged to move the racks from the presenting device to the rack-supporting means within the first chamber, from each chamber to the next, and from the last chamber to a point without the tank.

12. In combination with a tank or receptacle; means for supporting a series of bottle-trays therein; tracks or supports located at the discharge end of the tank in line with said supporting means; means for advancing the trays from the supporting means onto the tracks, a series of brushes movable toward and from said tracks and adapted to clean the bottles supported thereby; and means for moving the brushes.

13. In combination with a tank or receptacle; means for supporting a series of bottle-holding racks or trays therein; tracks or supports located at the discharge end of the tank in line with said supporting means; means for periodically advancing the racks along the supporting means; a series of brushes located below the tracks; and means for bringing said brushes into operative relation with the bottles carried by the racks while the racks are at rest upon the tracks.

14. In a machine for washing bottles, the combination of means for holding a series of bottles in an inverted position; a series of spindles arranged to move into the bottles; means for forcing water through said spindles; a second series of spindles or brushes arranged to pass between the bottles and act upon the outer faces thereof; and means for moving the spindles into and out of operative relation with the bottles.

15. In a machine for washing bottles, the combination of means for holding a series of bottles; a series of spindles arranged to enter the bottles and act upon the inner faces thereof; a second series of spindles or brushes adapted to pass between the bottles and act upon the outer surfaces thereof; means to move the spindles into and out of operative relation with the bottles; means for rotating the spindles; and means for forcing water through the spindles.

16. In a machine for washing bottles, the combination of means for holding a series of bottles; a mouth-piece plate movable toward and from the bottles; a series of spring-pressed mouth-pieces carried by said plate; means for moving the mouth-piece plate and thereby drawing the mouth-pieces into contact with the bottles; a series of spindles arranged in line with the mouth-pieces; and means for moving the spindles into and out of the bottles.

17. In a machine for washing bottles, the combination of a frame; a power shaft carried thereby; a worm mounted upon the shaft; a worm-wheel meshing therewith; a shaft driven by the worm-wheel; a cam mounted upon said shaft; a pair of frames working in line with said cam, the cam being arranged to move the frames in opposition to each other; a track carried by the main frame and adapted and arranged to support a series of bottle-holding racks; means for moving said racks; connections intermediate one of said frames and said means, for imparting reciprocatory movement to said means; a frame or bed; a series of spindles carried thereby; and connections intermediate said bed and the second cam frame for raising and lowering the bed, substantially as described.

18. In a machine for washing bottles, the combination of a suitable frame; means for advancing a series of bottle-holding racks therethrough; a bed; a hollow box carried by the bed; a series of bearing members supported by the upper portion of said box; a series of hollow spindles mounted in said bearing members; gearing for rotating said spindles; means for raising and lowering the bed and its attached parts; a water supply pipe; an air supply pipe extending into the water supply pipe; and a telescopic pipe connected to the box, said pipe coacting with the water supply pipe, substantially as described.

19. In a machine of the character specified, the combination of a tank; a shaft extending therethrough; means carried by said shaft for supporting a series of bottle-holding racks; a series of washing spindles; means for advancing the racks from the tank into position over the washing spindles; means for operating said advancing means; means for raising and lowering the spindles into and out of operative relation with the bottles; and means for imparting a step-by-step movement to the shaft, said means comprising a crank-arm secured to a constantly-rotating portion of the machine, a rack, a pitman connecting said crank-arm and rack, a sector gear meshing with said rack, a notched disk keyed to the shaft, and a pawl carried by the gear and coacting with the disk.

20. In a machine for washing bottles, the combination of a hollow chamber; a series of spindle-supports mounted thereon, each of said supports being provided with a cone-shaped bearing face at its upper and lower ends; a spindle passing through each of said supports; a gear secured to the lower end of the spindle and provided with a cone-shaped bearing face arranged to coact with the corresponding face formed at the lower end of the support; and a cone-shaped bearing secured to the spindle and coacting with the corresponding face at the upper end of the support.

21. In a machine for washing bottles, the combination of a hollow chamber; a series of spindle-supports mounted thereon, each of said supports being provided with a cone-shaped bearing face at its upper and lower ends; a spindle passing through each of said supports; and a cone-shaped bearing member carried by the spindle, contacting with the corresponding face formed upon the support, whereby a tight joint will be effected between said parts, substantially as described.

22. In an apparatus of the character specified, the combination of a tank; means mounted therein for supporting a series of bottle-holding racks or trays; a wheel-like member located without the tank; means carried thereby for holding a plurality of bottle racks or trays; and means for rotating said member to move the trays successively into line with the supporting means.

23. In an apparatus of the character specified, the combination of a tank; means mounted therein for supporting a series of bottle-holding racks or trays; a wheel-like member located without the tank; means carried thereby for holding bottle-racks or trays; means for rotating said member to bring the trays successively into line with the supporting means; and means for advancing the trays from said rotating member to the supporting means.

24. In an apparatus of the character specified, the combination of a tank; means mounted therein for supporting a series of bottle-holding racks or trays; a wheel-like member located without the tank; means carried thereby for holding bottle-racks or trays; means for rotating said member to bring the trays successively into line with the supporting means; and reciprocating mechanism coextensive of the supporting means and the rotating member, to advance the trays along the supporting means and from the rotating member onto said supporting means.

25. In a machine for washing bottles, the combination of means for holding a series of bottles; a series of spindles arranged to enter the bottles; a second series of spindles adapted to pass between the bottles and act upon the outer surfaces thereof; means for moving the spindles into and out of operative relation with the bottles; and means for rotating the spindles.

26. In a machine for washing bottles, the combination of means for holding a series of bottles; a mouth-piece plate; a series of independently yieldable mouth-pieces carried thereby; means for normally drawing the mouth-piece plate toward the mouths of the bottles; a series of spindles; means for moving the spindles into and out of operative relation with the bottles; means for rotating the spindles; and means for forcing water through the spindles.

27. In a machine for washing bottles, the combination of means for holding a series of bottles; a mouth-piece plate; a series of mouth-pieces carried thereby; means for normally elevating said mouth-piece plate and drawing the mouth-pieces into contact with the mouths of the bottles; a series of spindles held in line with the mouth-pieces; means for reciprocating the spindles and causing them to pass into and out of operative relation with the bottles; and connections intermediate said means and the mouth-piece plate for drawing the mouth-pieces out of contact with the bottles as the spindles are withdrawn.

28. In a machine for washing bottles, the combination of means for holding a series of bottles; a movable mouth-piece plate; a series of mouth-pieces carried thereby; springs serving normally to elevate the mouth-piece plate and to carry the mouth-pieces into contact with the mouths of the bottles; a series of spindles; means for moving said spindles endwise into and out of the bottles; and connections intermediate said means and the mouth-piece plate for withdrawing the mouth-pieces from contact with the bottles as the spindles are fully withdrawn.

29. In a machine for washing bottles, the combination of means for holding a series of bottles; means for properly positioning and holding said bottles with relation to each other; a series of spindles adapted to act upon the bottles; means for moving the spindles toward and from the bottles and into and out of operative relation therewith; and connections intermediate said means and the means for positioning and holding the bottles, whereby said positioning and holding means will be withdrawn from contact with the bottles when the spindles are fully withdrawn.

30. In a machine for washing bottles, the combination of a suitable frame; a fixed track or way carried thereby and adapted and arranged to directly support a bottle-holding rack; means for periodically advancing said rack along the way; a series of spindles; and means serving to move said spindles into and out of operative relation with the bottles, while the rack-advancing means is at rest, substantially as described.

31. In a machine for washing bottles, the combination of a suitable frame; a track or way carried thereby and adapted and arranged to support a bottle-holding rack; means for periodically advancing said rack along the way; a series of spindles; means for moving said spindles endwise into and out of operative relation with the bottles while the rack-advancing means is at rest; a mouth-piece plate; mouth-pieces carried thereby; means for normally moving said plate into operative relation with the bottles carried by the rack; and connections intermediate said mouth-piece plate and the means for operating the spindles for drawing the mouth-pieces out of contact with the bottle-mouths as the spindles are carried out of operative relation with the bottles prior to the forward movement of the rack through the machine by the operation of the advancing means, substantially as described.

32. In a machine for washing bottles, the combination of a suitable frame; a track or way carried thereby and adapted and arranged to support a series of bottle-holding racks; a series of washing spindles; a series of rinsing spindles; means for raising and lowering said spindles into and out of operative relation with the bottles carried by the racks; and means for advancing the racks along the track or way from one series of spindles to the other, said means coming into operation while the spindles are lowered.

33. In a machine for washing bottles, the combination of a suitable frame; a track or way carried thereby and adapted and arranged to support a series of bottle-holding racks; a series of washing spindles; a series of rinsing spindles; means for periodically raising and lowering said spindles; a mouth-piece plate; a series of mouth-pieces carried thereby; means for normally drawing said mouth-pieces into contact with the mouths of the bottles; connections intermediate said mouth-piece plate and the means for raising and lowering the spindles, and serving to withdraw the mouth-pieces from contact with the bottles when the spindles are lowered; and means for advancing the racks along the track or way when the spindles are in their lowered position.

34. In a machine for washing bottles, the combination of a suitable frame; a track or way mounted thereon and adapted and arranged to support a bottle-holding rack; a mouth-piece plate; a series of mouth-pieces carried thereby; yielding means for drawing said plate and mouth-pieces into contact with the bottles, whereby the plate and mouth-pieces may adapt themselves to bottles of different lengths; and a series of spindles for cleaning the bottles.

35. In a machine for washing bottles, the combination of a suitable frame; a track or way carried thereby and adapted and arranged to support a bottle-holding rack; a mouth-piece plate; a series of mouth-pieces carried thereby; means for yieldingly moving said plate toward the bottles; means for withdrawing said mouth-piece plate from the bottles; a series of spindles for cleaning the bottles; and means for advancing the rack along the way when said mouth-pieces are withdrawn.

36. In a machine for washing bottles, the combination of means for supporting a series of bottle-holding racks; and mechanism for advancing the racks along said means, said mechanism comprising two longitudinally-movable members, hooks pivotally connected to said members whereby the members may be moved longitudinally with relation to each other, and means for imparting motion to one of said members, whereby one member will be moved to a slight extent independently of the other and both members then moved forward together.

37. In a machine for washing bottles, the combination of means for supporting a series of bottle holding racks; and mechanism for advancing the racks, said mechanism comprising a series of hooks, and means for supporting said hooks to cause them to project downwardly into the path of travel of the racks as the parts are moved forward in one direction, and to be simultaneously withdrawn out of the path of travel of the racks as the advancing mechanism is moved in the opposite direction.

38. In a machine for washing bottles, the combination of means for supporting a series of bottle-holding racks; a hook-supporting member overlying the bottle-racks; means for supporting said member; a series of hooks pivotally connected to said member; a second member pivotally connected to the upwardly-extending ends of the hooks; a spring tending normally to move said second member endwise and to rock the hooks upon their fulcrums or pivotal connections on the supporting member to thereby elevate their downwardly-projecting ends; and means for applying power to the second member, whereby said member will be moved independently of the other member to a slight extent in order to raise or lower the hooks according to the direction of movement and to then advance the mechanism as a whole.

39. In a machine for washing bottles, the combination of means for supporting a series of bottle-holding racks; and mechanism to advance said racks along said supporting means, said mechanism comprising a trough-shaped member carried by suitable brackets secured to the frame of the machine, a series of hooks pivotally secured to said trough-shaped member, the lower ends of the hooks extending downwardly through openings formed in the bottom of the trough-shaped member, a pair of bars pivotally secured to the upwardly-extending ends of the hooks, an arm projecting upwardly from the trough-shaped member, a rod extending outwardly from the bars and passing freely through said arm, a spring surrounding the rod and serving normally to draw the same in a rearward direction, a rack secured to the bars, and means for imparting a reciprocating motion to said rack and through it to the other members.

40. In a machine for washing bottles, the combination of means to support a series of bottle-holding racks; and mechanism to advance said racks, said mechanism comprising a hook-supporting member, a series of hooks pivotally connected thereto, a second member pivotally connected to the upwardly-extending ends of the hooks, means serving to move said second member endwise and to thereby elevate the lower ends of the hooks, a rack, a lost-motion connection intermediate said rack and said second member, and means for imparting motion to said rack.

41. In a machine for washing bottles, the combination of a suitable frame; means for advancing a series of bottle-holding racks through the upper portion of said frame; a bed; a box carried by the bed; a series of spindles supported upon said bed; gears connected to the lower ends of the spindles within the box; means for driving said gears and thereby imparting rotary motion to said spindles; means for raising and lowering the bed and its attached parts; and means for supplying water and air under pressure to said box.

42. In a machine for washing bottles, the combination of a suitable frame; means for advancing a series of bottle-holding racks through the upper portion thereof; a bed; a box secured to said bed; a series of hollow spindles mounted upon and carried by said bed; means for rotating said spindles; means for raising and lowering the bed and its attached parts; a water supply pipe; an air supply pipe; and a telescopic connection carried by the box and coacting with the water supply pipe.

In testimony whereof I have signed my name to this specification in the presence of two subscribing witnesses.

OTTO EICK.

Witnesses:
  F. ZIMMERLY,
  A. BURNS.